March 30, 1943.  G. EGLOFF  2,315,192
CATALYTIC CRACKING OF HYDROCARBONS
Filed May 17, 1940
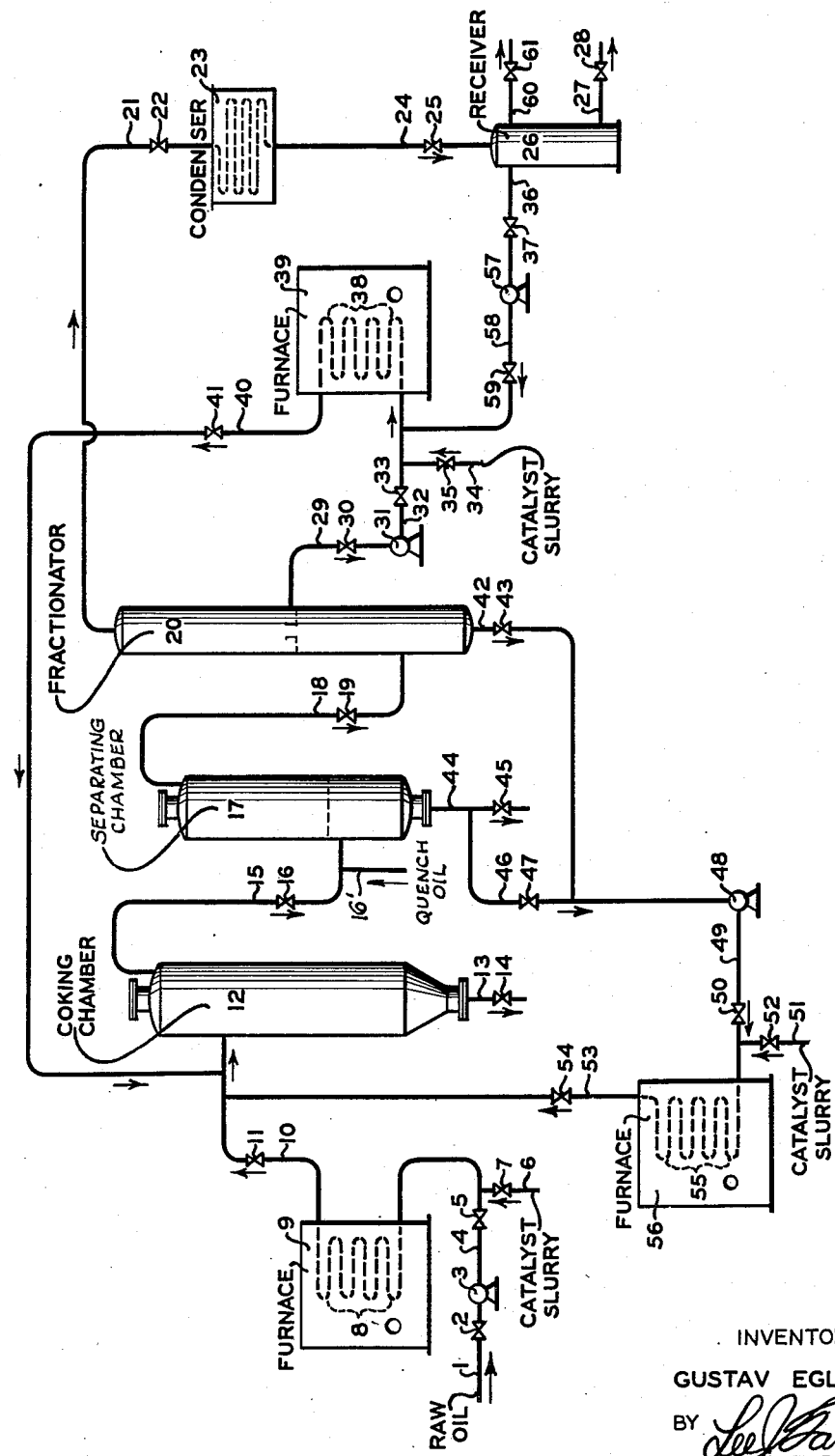
INVENTOR
GUSTAV EGLOFF
BY Lee J. Gary
ATTORNEY Patented Mar. 30, 1943

2,315,192

UNITED STATES PATENT OFFICE 2,315,192

CATALYTIC CRACKING OF HYDROCARBONS

Gustav Egloff, Chicago, Ill., assignor to Universal Oil Products Company, Chicago, Ill., a corporation of Delaware Application May 17, 1940, Serial No. 335,649

4 Claims. (Cl. 196—48)

This invention relates to a process for converting hydrocarbon oil into valuable products including high anti-knock gasoline by treatment of said hydrocarbon oil with a powdered catalytic agent under suitable conditions to bring about cracking thereof.

The use of catalytic agents to assist the thermal decomposition of hydrocarbon oils such as those of petroleum origin into high yields of gasoline and other valuable products has been practiced. Among the agents employed are the reduced metal catalysts including iron, cobalt, nickel, etc., which are subject to a number of disadvantages including the fact that they are poisoned by sulfur compounds which may be present in oils undergoing conversion, and furthermore that they tend to promote gas and carbon-forming reactions with the net result that the catalyst life is comparatively short. Another type of cracking catalyst is the activated earth type in which naturally occurring clays are used which have been treated with acids or other chemicals to increase their catalytic activity.

Still another type of catalyst is made up of activated alumina or magnesia which may have deposited thereon various promoting oxides from the left-hand column of groups IV, V, and VI of the periodic table and include particularly such oxides as those of chromium, molybdenum, vanadium, etc.

A further type of catalyst, which is the preferred material of this invention is the so-called silica-alumina, silica-zirconia and silica-alumina-zirconia composite which is manufactured by the separate or simultaneous precipitation of the component compounds followed by washing, drying and calcining steps whereby a finished catalyst is prepared. The catalysts are prepared under such conditions that alkali-metal ions are substantially eliminated in order to obtain adequate catalytic activity and stability in so far as an extended life is concerned.

This invention particularly relates to an improved process for the catalytic cracking of petroleum hydrocarbons by using a slurried catalyst. In this improved process, different fractions are processed under independently controlled cracking conditions, cracking and coking steps operating in a cooperative and interdependent manner which results in a high degree of selectivity with respect to the cracking conditions to which each of the various streams of different cracking stocks are subjected with resulting high yield of antiknock gasoline and minor yields of coke and gas.

One of the advantageous and novel features of the invention resides in the provision for recycling of a portion of the receiver gases for commingling with a side cut obtained from the fractionating column for cracking with a slurried catalyst in a third cracking zone.

This invention is, however, not predicated upon any particular feature or step of the process but rather upon the novel and advantageous combination of interdependent and cooperative steps.

In one specific embodiment the present invention comprises subjecting a hydrocarbon oil charging stock to catalytic cracking with a slurried catalyst in a primary reaction zone, commingling the conversion products from said primary reaction zone with those obtained from a second and third catalytic cracking zones operating in a manner to be subsequently described, directing the combined conversion products to a coking chamber, directing the mixture of vapors and entrained liquid evolved from said coking chamber to a separating chamber for separation of the vapors from the liquid residue, directing the vapors from said separating chamber to a fractionation step for the separation of gasoline boiling range hydrocarbons and lighter gases, an intermediate boiling fraction and a higher boiling fraction, commingling said higher boiling fraction with the liquid residue obtained from the separating chamber, subjecting said mixture to catalytic cracking with slurried catalyst in a second cracking zone, commingling the conversion products from said second cracking zone with the conversion products from the other two cracking zones as previously mentioned, directing the gasoline boiling range hydrocarbons and normally gaseous products obtained as an overhead from the fractionating column to a cooler and condenser, collecting the condensate as a product of the process, commingling the uncondensed gases with the intermediate boiling fraction obtained from the fractionating column and subjecting the mixture to catalytic cracking with a slurried catalyst in the third cracking zone and commingling the conversion products from the third cracking zone with the conversion products obtained from the other two cracking zones as already described.

The accompanying diagrammatic drawing shows in conventional side elevation one specific form of the apparatus in which the object of the invention may be accomplished. It is to be understood that the invention is not limited to the specific form of apparatus herein disclosed and that various modifications of the apparatus herein described may be made without departing from the broad scope of the invention.

Referring now to the drawing, charging stock for the process such as a distillate fraction of petroleum or a topped crude oil is introduced through line 1, valve 2, pump 3 to line 4, valve 5. The powdered catalytic material may be introduced in the form of a slurry through line 6, valve 7 and the mixture of charging stock and slurry catalyst is discharged into heating coil 8 so disposed as to receive heat from furnace 9. In the drawing, heating coil 8 acts as a primary cracking zone, but any suitable reactor adaptable to use with powdered catalyst may be employed. This includes a vertical type of reactor containing contact members such as baffles, bubble trays, etc. The catalytic cracking step is carried out at a temperature within the range of 500–1200° F. and at a pressure of the order of 50–1000 pounds per square inch or higher. The exact choice of conditions will depend to a large extent upon the stock being processed and the character of the products which are to be obtained. For example, when operating at relatively elevated pressures of the order of 100 to 1000 pounds per square inch and a temperature of about 500–900° F., a substantially olefin-free gasoline is produced. When operating at temperatures in excess of 900° F., a more olefinic type of gasoline is produced. The latter type usually has a somewhat higher octane number and the former type of gasoline is more suitable for use in aviation motor fuels because of the low olefin content and the relatively higher susceptibility to tetraethyl lead. The reaction products including the partially spent catalyst are withdrawn from coil 8 through line 10, valve 11, after which they are commingled with the conversion products from the second and third reaction zones operating in a manner to be subsequently described. The combined conversion products from the three catalytic cracking zones enter coking chamber 12. When desired, a plurality of coking chambers similar to chamber 12 may be employed, although not illustrated, in order to provide additional space for the deposition of coke, in which case the coking chambers are alternately operated, cleaned and prepared for further operation so that the duration of the operating cycle of the process will not be limited by the capacity of the coking chambers. Coke is allowed to accumulate in chamber 12 from which it may be removed in suitable well known manner (by means not shown), after the operation of the chamber has been completed and after it has been isolated from the rest of the system. Chamber 12 is provided with a drain line 13 controlled by valve 14 which may also serve as a means of introducing water, steam or other suitable cooling medium into the coking chamber after it has been isolated from the rest of the system in order to hasten cooling and facilitate cleaning of the chamber. Vapors leaving coking chamber 12 are directed by way of line 15, valve 16 to separating chamber 17. The vapors entering chamber 17 may be quenched by the high boiling fraction obtained from the fractionator in the process or other suitable cooling medium which may be introduced through line 16'. The vaporous product obtained from chamber 17 is removed by way of line 18, valve 19 and directed to fractionating column 20. Vapors leaving fractionating column 20 enter line 21 and after passing through valve 22 enter condenser 23 for cooling and condensation of the liquid portion thereof. The mixture of liquid and gaseous products leaves condenser 23 by way of line 24, valve 25 and enters receiver 26 wherein the gases are separated from the liquid and the latter collected as a product of the process. It is removed by way of line 27, valve 28. Gases collected in receiver 26 are removed by way of line 36, valve 37 and enter compressor 57 from which they are directed by means of line 58, valve 59 to line 32 wherein they are commingled with an intermediate boiling fraction obtained as a side cut from column 20 from which the side cut is removed by way of line 29, valve 30 and directed by means of pump 31 to line 32, valve 33. Cracking catalyst in the form of a slurry is added to this mixture of gases and liquid by way of line 34, valve 35. The hydrocarbon charge plus slurry catalyst is directed from line 32 to heating coil 38 disposed to receive heat from furnace 39. The general operation of this cracking zone (referred to as third cracking zone) is similar to that of the primary or first cracking zone. The conversion products together with the used catalyst leave coil 38 by way of line 40, valve 41 after which they are directed to line 10 for commingling with the conversion products of the primary and secondary catalytic cracking zones. The higher boiling hydrocarbons obtained in fractionating column 20 are removed by way of line 42, valve 43 and directed to line 46 where they are commingled with the liquid obtained from chamber 17. These combined liquids are directed by means of pump 48 into line 49 wherein after passing through valve 50, they are commingled with a slurry catalyst introduced by way of line 51, valve 52. After commingling with the slurry catalyst the liquid enters coil 55 which receives heat from furnace 56. The products from this cracking zone (referred to as secondary cracking zone) enter line 53 and after passing through valve 54 are directed to line 10 for commingling with the conversion products of the first and third cracking zones as already described.

The following example is given to illustrate the usefulness and practicability of my process but should not be construed as limiting it to the exact conditions indicated therein.

A topped Mid-Continent crude is commingled with 5% by weight of alumina-silica catalyst supplied in the form of a slurry and introduced to a primary cracking zone and cracked at a temperature of 940° F. and average pressure of 200 pounds per square inch. The conversion products from the primary cracking zone are commingled with the conversion products of a second and a third cracking zone and the combined conversion products introduced to a coking chamber which operates at a slightly reduced pressure of approximately 100 pounds per square inch. The vapors and entrained liquid leaving the coke chamber are quenched with a high boiling liquid fraction obtained from a fractionator and directed to a chamber which is maintained at a temperature of 850° F. and a pressure of 40 pounds per square inch. A liquid level is maintained in the chamber and the reaction products introduced at a point about one-fourth of the distance from the bottom of the chamber so that the vaporous portion passes upward through the liquid residue. The vapors are directed to the fractionator wherein they are separated into an overhead product which includes gasoline boiling range hydrocarbons and light gases, a side cut and a higher boiling fraction.

A portion of the liquid removed from the separating chamber is commingled with the higher boiling fraction obtained from the fractionator and the combined liquids are catalytically cracked in the second cracking zone. Before entering the second cracking zone, enough cracking catalyst in the form of a slurry is added to bring the catalyst content up to 5% by weight of the charge. A portion of the liquid residue obtained in the separating chamber is removed from the system. The cracking catalyst contained in this residual liquid may be separated and reactivated by treatment with an oxygen-containing gas at a temperature of 1000° F. The reactivating catalyst may then be returned to the system. The oil separated from the catalyst is suitable for use as an industrial fuel oil. The secondary cracking zone operates at an exit temperature of 950° F. and a pressure of 250 pounds per square inch. The conversion products from the secondary cracking zone are commingled with those obtained from the other two cracking zones as already described. The overhead product obtained from the fractionating column is separated into a gasoline and normally gaseous products. A portion of the gases separated in the receiver for the unstabilized gasoline is commingled with the intermediate boiling fraction obtained as a side cut from the fractionator and after adding a cracking catalyst in the form of a slurry equivalent to 6% by weight of the charge, the mixture is directed to a third cracking zone. This third cracking zone operates under a pressure of 750 pounds per square inch and a temperature of 950° F. The conversion products from the third cracking zone are commingled with those obtained from the first and second cracking zones and separated as already described. The gasoline after stabilization may have an octane number of 77 by the C. F. R. motor method. A yield of gasoline equal to 65% of the original charge may be obtained.

I claim as my invention:

1. A process for the preparation of high antiknock gasoline and other valuable products which comprises subjecting a hydrocarbon oil charging stock to the action of slurried catalyst in a primary cracking zone, commingling the conversion products from said primary cracking zone with the conversion products from a second and third catalytic cracking zone operating in a manner subsequently set forth, directing the combined conversion products to a coking zone to effect reduction of the liquid portion to coke, removing the vaporous products from the coking zone and fractionating the same into gasoline boiling range hydrocarbons and lighter products and an intermediate boiling fraction and higher boiling hydrocarbons, subjecting at least a portion of said higher boiling hydrocarbons to catalytic cracking with a slurried catalyst in a secondary cracking zone, commingling the conversion products from the second cracking zone with those of the first and third cracking zones as previously set forth, separating the aforesaid gasoline range boiling hydrocarbons and lighter gases, commingling gases thus separated with an intermediate boiling fraction obtained from the fractionating operation, directing said mixture of gases and liquids to a third catalytic cracking zone for cracking with a slurried catalyst and commingling the products from the third cracking zone with conversion products from the first and second cracking zones for treatment as previously set forth.

2. The process of claim 1 wherein the slurried catalyst comprises powdered material selected from the group consisting of silica-alumina, silica-zirconia and silica-alumina-zirconia.

3. The process as set forth in claim 1 wherein the three cracking zones are operated at a temperature within the range of 500–1200° F. and a pressure within the range of 50–1000 pounds per square inch.

4. A conversion process which comprises subjecting hydrocarbon oil to catalytic cracking in admixture with a slurried catalyst in a primary cracking zone, introducing the conversion mixture to a vaporizing zone and therein separating vapors and gases from residue, subjecting the vapors and gases to fractional condensation to form a relatively heavy reflux condensate, a lighter reflux condensate, gasoline distillate and a normally gaseous product, recovering said gasoline distillate, combining normally gaseous products with at least a portion of said lighter reflux condensate, subjecting the mixture to catalytic cracking conditions with a slurried catalyst in a second cracking zone and introducing the resultant products to said vaporizing zone, cracking at least a portion of said heavy reflux condensate with a slurried catalyst in a third cracking zone and introducing the resultant products to said vaporizing zone.

GUSTAV EGLOFF.